(12) United States Patent
Cummins et al.

(10) Patent No.: US 9,354,800 B2
(45) Date of Patent: *May 31, 2016

(54) RICH DRAG DROP USER INTERFACE

(75) Inventors: Charles Cummins, Seattle, WA (US);
Cornelis K. Van Dok, Bellevue, WA (US); David G. De Vorchik, Seattle, WA (US); Stephan Hoefnagels, Seattle, WA (US); Timothy P. McKee, Seattle, WA (US); Tyler K. Beam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 781 days.

This patent is subject to a terminal disclaimer.

(21) Appl. No.: 12/569,370

(22) Filed: Sep. 29, 2009

(65) Prior Publication Data

US 2010/0017734 A1 Jan. 21, 2010

Related U.S. Application Data

(63) Continuation of application No. 11/179,776, filed on Jul. 13, 2005, now Pat. No. 7,665,028.

(51) Int. Cl.
*G06F 3/048* (2013.01)
*G06F 3/0486* (2013.01)
*G06F 3/0481* (2013.01)
*G06F 3/0488* (2013.01)
*G06F 3/0482* (2013.01)

(52) U.S. Cl.
CPC .......... *G06F 3/0486* (2013.01); *G06F 3/04817* (2013.01); *G06F 3/0482* (2013.01); *G06F 3/04883* (2013.01)

(58) Field of Classification Search
CPC . G06F 3/0486; G06F 3/04817; G06F 3/0482; G06F 3/04883
USPC ........................................ 715/769, 799, 825
See application file for complete search history.

(56) References Cited

U.S. PATENT DOCUMENTS 5,598,524 A * 1/1997 Johnston et al. ............... 715/769
5,867,163 A * 2/1999 Kurtenbach ................... 715/840
5,999,938 A * 12/1999 Bliss et al.
6,160,552 A * 12/2000 Wilsher et al. ................. 715/739

(Continued)

FOREIGN PATENT DOCUMENTS

TW 530257 5/2003
TW 200505241 A 2/2005

(Continued)

*Primary Examiner* — Tuyetlien T Tran
(74) *Attorney, Agent, or Firm* — Jim Banowsky; Judy Yee; Micky Minhas

(57) ABSTRACT

In an electronic file system, preview information is provided to the user during a drag operation of a selected object onto a target object. The information indicates what type(s) of action is to be taken should the selected object be dropped onto the target object. The action(s) to be taken may depend upon the type of the selected object and/or the type of the target object. For example, where the selected object is an item and the target object is a persisted auto-list, the action may include adding, removing, or modifying one or more properties of the selected object to conform to one or more criteria defined by the persisted auto-list. Also, numerical feedback may be provided to the user where multiple objects are selected. For example, where seven objects are selected, the textual number "7" may appear next to the cursor.

20 Claims, 9 Drawing Sheets

(56) References Cited

U.S. PATENT DOCUMENTS

| | | | |
|---|---|---|---|
| 6,246,411 B1* | 6/2001 | Strauss | 715/863 |
| 6,288,732 B1* | 9/2001 | Moriwaki | 715/769 |
| 6,437,807 B1* | 8/2002 | Berquist et al. | 715/764 |
| 6,483,525 B1* | 11/2002 | Tange | 715/765 |
| 6,535,230 B1* | 3/2003 | Celik | 715/769 |
| 6,628,309 B1* | 9/2003 | Dodson et al. | 715/769 |
| 6,816,863 B2 | 11/2004 | Bates et al. | |
| 2002/0059288 A1* | 5/2002 | Yagi et al. | 707/102 |
| 2002/0080180 A1* | 6/2002 | Mander et al. | 345/769 |
| 2003/0001895 A1* | 1/2003 | Celik | 345/769 |
| 2003/0117403 A1* | 6/2003 | Park et al. | 345/503 |
| 2003/0184587 A1* | 10/2003 | Ording et al. | 345/769 |
| 2003/0222915 A1* | 12/2003 | Marion et al. | 345/769 |
| 2004/0008226 A1* | 1/2004 | Manolis et al. | 345/769 |
| 2004/0056896 A1* | 3/2004 | Doblmayr et al. | 345/769 |
| 2004/0095390 A1* | 5/2004 | Arning et al. | 345/769 |
| 2004/0230599 A1* | 11/2004 | Moore et al. | 707/102 |
| 2005/0088410 A1* | 4/2005 | Chaudhri | 345/157 |
| 2005/0166159 A1* | 7/2005 | Mondry et al. | 715/769 |
| 2005/0177796 A1* | 8/2005 | Takahashi | 715/769 |
| 2005/0246331 A1* | 11/2005 | De Vorchik et al. | 707/3 |
| 2006/0031775 A1* | 2/2006 | Sattler et al. | 715/769 |
| 2006/0129945 A1* | 6/2006 | Dettinger et al. | 715/769 |
| 2007/0288860 A1* | 12/2007 | Ording et al. | 715/779 |
| 2008/0155439 A1* | 6/2008 | Stern et al. | 715/769 |

FOREIGN PATENT DOCUMENTS

| | | |
|---|---|---|
| WO | 9938092 A1 | 7/1999 |
| WO | 0163919 A1 | 8/2001 |

\* cited by examiner

| SELECTED OBJECT | TARGET OBJECT | | | | | |
|---|---|---|---|---|---|---|
| | FOLDER (SAME VOLUME) | FOLDER (DIFFERENT VOLUME) | LIST (SAME VOLUME) | LIST (DIFFERENT VOLUME) | PERSISTED AUTO-LIST (SAME SCOPE) | PERSISTED AUTO-LIST (DIFFERENT SCOPE) |
| ITEM | MOVE | COPY | ADD A SHORTCUT TO LIST | ADD A SHORTCUT TO LIST | SET PROPERTIES | COPY + SET PROPERTIES |
| MULTI-SELECT ITEMS | MOVE | COPY | ADD A SHORTCUT TO LIST | ADD A SHORTCUT TO LIST | SET PROPERTIES | COPY + SET PROPERTIES |
| FOLDER | MOVE | COPY | ADD A SHORTCUT TO LIST | ADD A SHORTCUT TO LIST | SET PROPERTIES TO THE ITEMS IN THE FOLDER'S ITEM DOMAIN | COPY FOLDER TREE + SET PROPERTIES TO THE FOLDER'S ITEM DOMAIN |
| LIST | MOVE | COPY LIST | ADD A SHORTCUT TO LIST | ADD A SHORTCUT TO LIST | SET PROPERTIES ON THE ITEMS THE LIST REFERENCES | COPY LIST + COPY ITEMS INTO SCOPE + SET PROPERTIES ON THE ITEMS THE LIST REFERENCES |
| PERSISTED AUTO-LIST | MOVE | COPY AUTO-LIST | ADD A SHORTCUT TO LIST | ADD A SHORTCUT TO LIST | SET PROPERTIES ON THE AUTO-LIST RESULTS | COPY AUTO-LIST + AUTO-LIST RESULTS + SET PROPERTIES, ON THE AUTO-LIST RESULTS |
| STACK | MOVE | COPY | ADD A SHORTCUT TO LIST | ADD A SHORTCUT TO LIST | SET PROPERTIES ON THE STACK CONTENTS | COPY STACK + STACK CONTENTS + SET PROPERTIES, ON THE STACK CONTENTS |

FIG. 2

RICH DRAG DROP USER INTERFACE

PRIORITY

This is a continuation that claims the benefit of U.S. application Ser. No. 11/179,776, filed Jul. 13, 2005, which is entirely incorporated by reference.

BACKGROUND

Modern electronic file systems typically store files in a hierarchical tree structure. Each node of the tree is considered a folder that contains one or more files. Typically, in such electronic file systems the location of an item is limited by the organization defined the file system. For example, in many file systems each file is located in one (and only one) folder. This means that file lifetime and file organization are conflated. That is, a file can exist only while it has a location organized relative to other files or folders. In addition, a file cannot be placed in multiple organizations. This means that if a user wishes to view a file in multiple folders, for example, the user must make multiple copies of the file. This is both tedious and error-prone for the user, as well as wasteful of storage space.

In addition, when performing a drag/drop operation, it is not always clear to the user what action is going to be taken upon completion of the drag/drop operation. It can be even more confusing when multiple files for dragging/dropping have been selected together.

SUMMARY

There is a need for a more advanced electronic file system and user interface that more allows users to manipulate files and other objects in a more flexible way using a graphical user interface. With this flexibility comes an opportunity to provide richer information to the user as to what is happening while drag/drop operations are being performed.

Aspects of the present disclosure relate to various types of file system objects that may be implemented, including items, folders, lists, persisted auto-lists, and stacks. While folders, for example, contain actual objects, lists and persisted auto-lists contain references, or shortcuts, to objects, as opposed to the objects themselves. A persisted auto-list is automatically populated with references to objects having properties that conform to one or more criteria defined by the persisted auto-list.

Further aspects of the present disclosure are directed to providing preview information to the user during a drag operation of a selected object onto a target object in a graphical user interface. The preview information indicates what type(s) of action is to be taken if the selected object were to be dropped onto the target object, thereby providing the user with an opportunity to determine whether the particular drag/drop operation is desirable, before the drag/drop operation is completed. The particular action(s) to be taken may depend upon the type of the selected object and/or the type of the target object. For example, where the selected object is an item and the target object is a persisted auto-list, the action may include adding, removing, or modifying one or more properties of the selected object to conform to one or more criteria defined by the persisted auto-list.

Still further aspects of the present disclosure are directed to providing numerical feedback to the user when multiple objects are selected. For example, where seven objects are selected, the textual number "7" may appear next to the cursor. This may result in a much easier-to-understand user interface than in past interfaces where the multiple objects are scattered around the screen as they move. In conventional interfaces, it is sometimes difficult for a user to determine how many objects have been selected.

Still further aspects of the present invention are directed to performing various types of actions in response to different drag/drop combinations. The particular type of action performed may be determined by the type of the object being dropped and/or the type of the target object onto which the drop is to occur.

These and other aspects of the disclosure herein will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

FIG. 2 is a table showing illustrative actions that may be taken in response to particular drag/drop operations.

DETAILED DESCRIPTION OF ILLUSTRATIVE EMBODIMENTS

Illustrative Computing Environment

Figure 1:
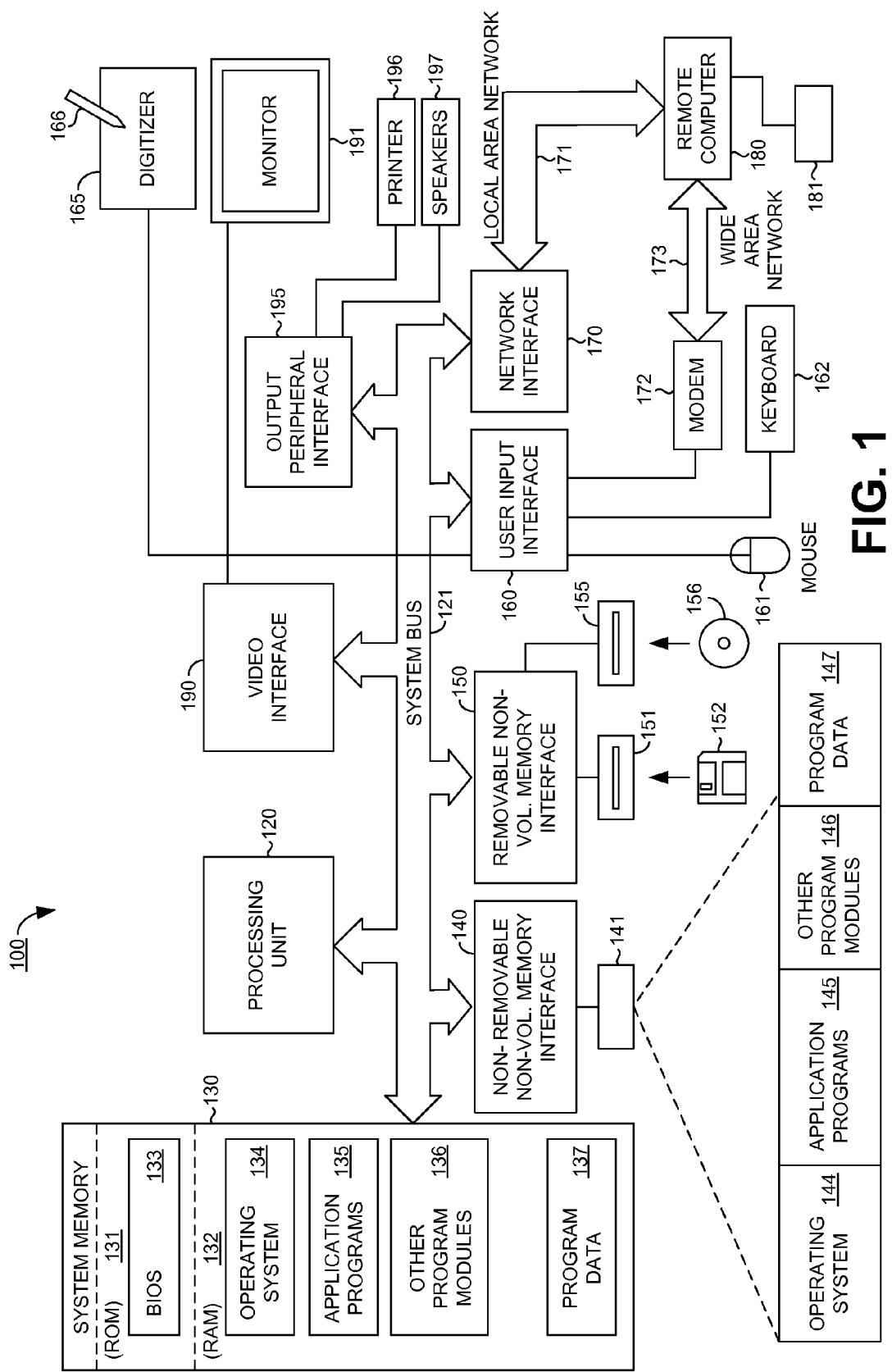
FIG. 1 is a functional block diagram of an illustrative computing environment.

FIG. 1 illustrates an example of a suitable computing environment 100 in which handwriting recognition functions and/or neural network creation, modification, and/or training may be implemented. Computing environment 100 is only one example of a suitable computing environment and is not intended to suggest any limitation as to the scope of use or functionality of the invention. Neither should computing environment 100 be interpreted as having any dependency or requirement relating to anyone or combination of components illustrated in illustrative computing environment 100.

Other general purpose or special purpose computing system environments or configurations may be used. Examples of well known computing systems, environments, and/or configurations include, but are not limited to, personal computers (PCs); server computers; hand-held and other portable devices such as personal digital assistants (PDAs), tablet-style PCs or laptop PCs; multiprocessor systems; microprocessor-based systems; set top boxes; programmable consumer electronics; network PCs; minicomputers; mainframe computers; distributed computing environments that include any of the above systems or devices; and the like.

The disclosure herein is at times described in the general context of computer-executable instructions, such as program modules, being executed by a computer. Generally, program modules include routines, programs, objects, components, data structures, etc. that perform particular tasks or implement particular abstract data types. Distributed computing environments may further be used where tasks are performed by remote processing devices that are linked through a communications network. In a distributed computing environment, program modules may be located in both local and remote computer storage media including memory storage devices.

With reference to FIG. 1, illustrative computing environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium that can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media.

System memory 130 includes computer storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162, a touch pad 165 (such as a digitizer) and stylus 166, and a pointing device 161 (commonly referred to as a mouse, trackball or touch pad). Touch pad 165 may be a separate physical device or may be integrated with a display device such as a monitor 191. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). Monitor 191 or other type of display device is also coupled to system bus 121 via an interface, such as a video interface 190. Video interface 190 may have advanced 2D or 3D graphics capabilities in addition to its own specialized processor and memory. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

File System Organization

An electronic file system may be implemented by computer 100 to manage files and other objects stored in the various electronic media to which computer 100 has access. The file system may be part of the other program modules 136 and/or part of operating system 134. The file system may be a traditional file system or a more advanced filing system that may be database-driven. In many traditional file systems, such as those based on a file allocation table (FAT) file system, traditional directory access to files assumes that users wish to maintain their files in a hierarchical directory tree. Files locations and the directory structure are dependent on one another; a user cannot move a file to another location without changing the directory structure.

On the other hand, a more advanced file system may be used that uses shortcut references, thus allowing files and other objects to appear in one or more location while actually being in another, different location. Such a file system may define various types of objects that provide a much more flexible way of managing files and other objects.

For example, one type of object is a list. For purposes of the present disclosure and claims, a list is an object that references a set of other objects in a particular order. The term "set" of objects as used in the present disclosure and claims is intended to include both a set of a plurality of objects and a set having only a single object. The objects referenced by the list may, for example, be an arbitrary set of objects each added to the list manually by the user. However, the objects referenced by a list are not actually stored in the list as they are in a conventional folder. Thus, more than one list may simultaneously reference the same object.

Another type of object that may be supported by the file system is a persisted auto-list. A persisted auto-list is similar to a list except that the set of objects referenced by a persisted auto-list are determined by a query. The query may define one or more criteria. Thus, for purposes of the present disclosure and claims, a persisted auto-list is defined as a list containing a set of objects that meet one or more criteria associated with the persisted auto-list. The content of a persisted auto-list is dynamic; the set of objects listed in a persisted auto-list may change in accordance a change in properties of various objects. For example, a persisted auto-list configured to contain references to all documents created by author John Doe (the query criteria in this case being type=documents and author="John Doe") may automatically update when John Doe creates a new file or deletes one of his files. The criteria associated with a persisted auto-list may include any criteria, such as object type, author, title, content, creation date, edit date, location in the file system (also referred to herein as "scope"), custom intrinsic properties, etc. Also, as discussed below, lists allow for extrinsic properties to be defined for objects referenced by those lists and persisted auto-lists.

Each object managed by the file system may include or otherwise be associated with one or more properties. These properties may be broadly categorized into two groups: extrinsic properties and intrinsic properties. The one or more criteria associated with a persisted auto-list form a query on the intrinsic properties of objects.

An extrinsic property is a property of an object that is stored separately from the object. In the context of a list, for example, the user may add a "List Notes" column that places comments only within the context of the list and not on the objects themselves that are referenced by the list. This may allow the user to make comments on objects that the user does not have the right to modify, for instance. Extrinsic properties would not travel with those objects outside of the context of that list. Thus, another list that references one or more of those same objects would not include the "List Notes" property of any of those items, unless of course the user added that property to the items in the context of the other list. Extrinsic properties may be manually added by the user or automatically added by the file system, operating system, and/or other program module.

An intrinsic property is a property that is stored with the item. For example, the title of a file may be considered to be an intrinsic property of the file where the title travels with the file. If the file were added to a particular folder or list, for instance, the file would still have its title. The content of an object is also an intrinsic property of the object. Also, the location of the object within the file system is another intrinsic property of the object.

Still another type of object that may be supported by the file system is a conventional folder. A folder is defined for purposes of the present disclosure and claims as an object that contains a set of other objects. A related type of object is a stack, which is a virtual container in a view representing the set of items that meet a given requirement. For instance, the user may stack a persisted auto-list or query results by "author" and then view all results by who wrote them. A stack would be presented for each author, where each stack may be of a different height based on the number of objects written by each author.

Still another type of object that may be supported by the file system is an item. An item may be, for example, a file, an email, a contact, or an appointment.

Objects referenced by lists and persisted auto-lists, as well as objects contained in folders and stacks, may be any types of objects in any combination. For example, a list, persisted auto-list, folder, or stack may each contain one or more files, emails, lists, persisted auto-lists, folder, stacks, and/or any other types of objects.

The file system may be organized into one or more volumes. A volume is defined for purposes of the present disclosure and claims as a physical storage medium or predetermined portion thereof represented by the file system as an individual storage resource.

Dragging/Dropping Objects

The operating system and/or file system may have a graphical user interface that presents an icon or other visual element that represents each object managed by the file system. The graphical user interface may further allow the user to drag and drop visual elements representing objects onto other visual elements representing other objects in a conventional manner. The terms "drag/drop" or "drag and drop" of a first object over or onto a second object, and variations thereof, will be used herein as shorthand language for the conventional dragging and dropping of a visual element representing the first object onto a visual element representing the second object. Many systems, such as Microsoft's WINDOWS line of operating systems, traditionally provide drag/drop functionality. Dragging and dropping can have different meanings in different contexts. For example, dragging a file onto a folder typically causes the file to be moved to into the folder. In other words, the location of the actual file object itself in the file system is changed. Also, dragging a document onto a printer object causes typically causes the document to be printed on the printer associated with the printer object. It should be noted that many such operating systems and file systems also provide for cut/copy/paste functionality. These are considered alternate user operations that obtain the same result. For example, dragging and dropping a file into a list may alternatively be accomplished by copying the file and pasting the file into the list.

However, drag/drop meanings need to be established between various combinations of objects and for contexts that have not previously been supported in traditional systems.

For example, what does it mean to drop an item into an existing persisted auto-list? Examples of such drag/drop meanings are discussed herein, with reference to FIG. 2. FIG. 2 shows which action(s) is/are to be performed in response to a drag/drop input made by the user. Each row in FIG. 2 corresponds to a different type of object that is to be dropped (the "selected object"), and each column corresponds to a different type of object (the "target object") onto which the selected object is to be dropped.

Thus, FIG. 2 deals with six different possible types of selected objects: a single item, a group of multiple items, a folder, a list, a persisted auto-list, and a stack. FIG. 2 also deals with six different possible types of target objects: a folder within the same volume as the selected object, a folder in a different volume from the selected object, a list within the same volume as the selected object, a list in a different volume from the selected object, an auto-list defining a scope (i.e., location in the file system) that includes the selected object, and an auto-list defining a scope that does not include the selected object.

FIG. 2 will now be discussed on a column-by-column basis. Referring to the "Folder (same volume) column of FIG. 2, where the target object is a folder in the same volume as the selected object, then the action taken is to move the selected object to be within the target object, regardless of the type of selected object. This makes sense as it is most likely the user's intention when the selected object and the target object are within the same volume.

Similarly, referring to the "Folder (different volume)" column, where the target object is a folder in a different volume from the selected object, then the action taken is to copy the selected object and place the copy within the target object, regardless of the type of selected object. Again, it is most likely the user's intention in this case that a copy of the selected object be placed in the target object, and not the original selected object itself, where the target object is in a different volume. There is an exception where the selected object is a stack, however. In this case, dragging/dropping a selected stack to a target folder results in a persisted auto-list being created that represents the selected stack in the target folder.

Referring to the "List (same volume)" and "List (different volume)" columns of FIG. 2, where the target object is a list, a drag/drop operation would cause a reference, or shortcut, to the selected object is placed in the list. This is true regardless of whether the target list is within the same volume as the selected object. There is an exception where the selected object is a stack, however. In this case, dragging a selected stack to a target list from a persisted auto-list results in a shortcut to the definition of the persisted auto-list being created, which is embedded within the target list (not persisted as a separate file). Again, these are most likely the user's intentions when the user performs such drag/drop operation.

Referring to the "Auto-List (same scope)" column of FIG. 2, dragging any selected item(s) onto a persisted auto-list defining a scope that includes the selected object causes one or more properties of the selected object to be modified, removed, or added so that the selected object falls within the criterion or criteria defined by the target persisted auto-list. For example, assume that the target persisted auto-list defines criteria that objects referenced by the persisted auto-list must be (type=document) and (author="John Doe"), with a scope of folder c:\work\clientxyz. In this case, the persisted auto-list would automatically list all objects within its scope that meet those criteria. Assume, for example, that a document is within the defined scope but either has no author assigned or has a different author property assigned to it. The operation of dragging and dropping the document onto the target persisted auto-list would cause properties of the document to be set, if possible, so as to meet the criteria required by the persisted auto-list. In this example, the author property of the document would be changed to "John Doe" so that the document may properly be listed by the persisted auto-list.

It is possible in certain situations that computer 100 determines that it is not possible to change the properties so as to meet all the criteria. For instance, if the object being dropped onto that same target persisted auto-list were not a document, then it would not make sense to change the type property of that object to be a document (since it is not in fact a document). In that case, the drag/drop operation may be disallowed.

Where the selected object to be dragged/dropped onto the target persisted auto-list in the same scope as the selected object is a folder, then the properties that are changed to meet the persisted auto-list criteria causes the items in the folder (but not the folder itself) to be referenced by the persisted auto-list. Likewise, the properties of the items in the selected folder are changed where possible to meet the criteria of the target persisted auto-list.

Where the selected object is a persisted auto-list, then dragging/dropping it onto another target persisted auto-list will set properties on the persisted auto-list results. In other words, properties of all of the items that conformed to the selected auto-list are changed, removed, or added such that they also conform to the target auto-list.

Where the selected object is a stack, then dragging/dropping it onto a target persisted auto-list will set the properties, where possible, of the contents of the stack to meet the criteria of the target persisted auto-list.

Referring to the "Auto-List (different scope)" column of FIG. 2, this column refers to the same situations as the previous column, except that now the selected object is outside the scope of the target persisted auto-list. In these cases, the selected object (or the objects referenced by the selected object, such as the objects listed in a selected list) is first copied, and the copy is placed within the scope of the target persisted auto-list. Then, the same actions referred to in the "Auto-List (same scope)" column are performed, except that the actions are performed on the copy instead of the original selected object.

Drag/Drop Modifiers

The actions resulting from the various drag/drop operations discussed in the examples above with regard to FIG. 2 are default actions. The default actions attempt to predict what the user's intentions are in performing each drag/drop operation. However, the user may manually override the actions to be taken by providing additional input along with a drag/drop operation. For example, the user may press a key on keyboard 162 while the drag/drop operation is being performed. For example, pressing the Shift key may cause any copy actions to be move actions, and pressing the Ctrl key may cause any move actions to instead be copy actions.

As further examples, when dragging to a list, pressing the Shift key while dragging may force the selected object to be moved to the target list's thicket folder, which is the location where the target list places objects when it collects objects. Or, when dragging to a list while pressing the Ctrl key, this may force the selected object to be copied to the list's thicket folder. When dragging to a persisted auto-list, then pressing the Shift key while dragging may force the selected object to be moved to the target persisted auto-list's default folder, which is the location where objects are placed when they are copied into the target auto-list's scope. Or, when dragging to a persisted auto-list while pressing the Ctrl key, this may force the selected object to be copied to the target persisted auto-list's default folder.

Drag/Drop Preview

Because there are now a wide variety of possible actions that may be taken in response to a drag/drop operation, it may be easy for the user to become confused as to what a particular drag/drop operation may mean. This may be true even though the system may be configured to take the most likely intended actions. Accordingly, it may be desirable to present feedback to the user a preview of some or all of the actions that are about to happen as a result of a given drag/drop operation, and/or a current status of the drag/drop operation. Based on this feedback, the user may then decide whether to complete, abort, or modify the drag/drop operation as desired.

This preview feedback may be presented in any form desired. For instance, the feedback may be in the form of iconic, graphical, textual, and/or any other type of feedback, and may be presented in any fixed or non-fixed portion of the display. The feedback may be visual and/or audible. Moreover, the feedback may move with the cursor and/or may be presented proximate to the cursor.

Figure 3:
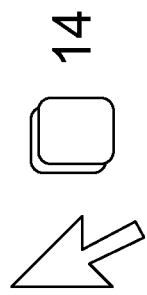

Examples of such preview feedback are shown in FIGS. 3-10. The shown feedback instances are merely illustrative. FIG. 3 shows an example of visual feedback that may occur during a pending drag/drop operation when the operation cannot be completed. This may occur, for example, responsive to the user having dragged an item over a persisted auto-list where the properties of the item cannot be modified to meet the criteria of the persisted auto-list.

Figure 4:
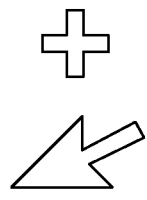

FIG. 4 shows an example of visual feedback that may occur during a pending drag/drop operation, indicating that the selected object will be copied in response to completion of the drag/drop operation. This may occur, for example, responsive to the user having dragged an item to a folder in a different volume.

Figure 5:
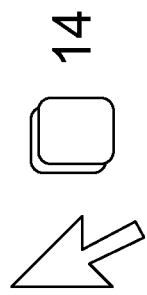
FIGS. 3-10 show illustrative preview feedback instances that may be presented in response to various drag/drop operations.

FIG. 5 shows an example of visual feedback that may occur during a pending drag/drop operation, indicating that multiple items have been selected. In this example, fourteen items have been selected. The number may dynamically change to indicate the actual number of items selected as each new item is added to the selection. In many conventional graphical user interface file systems, the selection of multiple files is indicated by the various icons of the files moving from their original displayed positions to new relative positions in accordance with the cursor. It can be difficult in that situation for the user to understand what is going on and how many files have been selected once their icons begin moving. In FIG. 5, however, the status of how many multiple selected items is easily viewed by the user. The icon to the left of the number in FIG. 5 may be a thumbnail of one of the selected items, such as the first item selected or the most recent item selected. Other information may also be provided such as the number of bytes selected.

Figure 6:
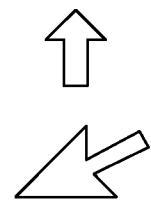

FIG. 6 shows an example of visual feedback that may occur during a pending drag/drop operation, indicating that the selected object will be added to a target list or target persisted auto-list in response to completion of the drag/drop operation.

Figure 7:
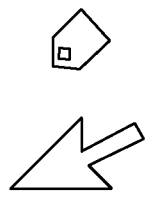

FIG. 7 shows an example of visual feedback that may occur during a pending drag/drop operation, indicating that a property of the selected object is to be added, removed, or modified, in response to completion of the drag/drop operation.

Figure 8:
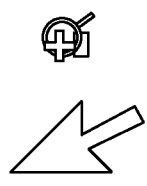

FIG. 8 shows an example of visual feedback that may occur during a pending drag/drop operation, indicating that a persisted auto-list is to be created in response to completion of the drag/drop operation. A persisted auto-list may be created in response to a drag/drop operation when, for example, a user drags a particular stack from an existing set of query results and drops the stack somewhere. In this case, a new persisted auto-list may be automatically created, in response to the drag/drop operation, that persists out the definition of that query.

Figure 10:
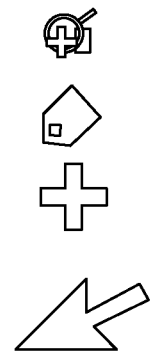
Figure 9:
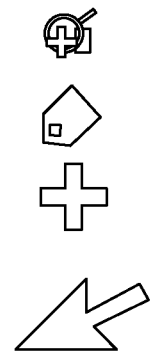

FIG. 9 shows an example of visual feedback that may occur during a pending drag/drop operation, indicating that the selected object is to be moved in response to completion of the drag/drop operation.

Where more than one action is to be taken, the various feedback instances, such as the icons in FIGS. 4-9, may be combined. For instance, FIG. 10 shows an example of visual feedback that may occur during a pending drag/drop operation, indicating that certain multiple actions are to be taken in response to completion of the drag/drop operation. In this example, responsive to completion of the pending drag/drop operation, three actions will be taken: the selected object will be copied, at least one of its properties will be added, removed, or modified, and a new persisted auto-list will be created. Although in this example the various icons are shown horizontally arranged, they may be arranged vertically or in any other manner.

Figure 11:
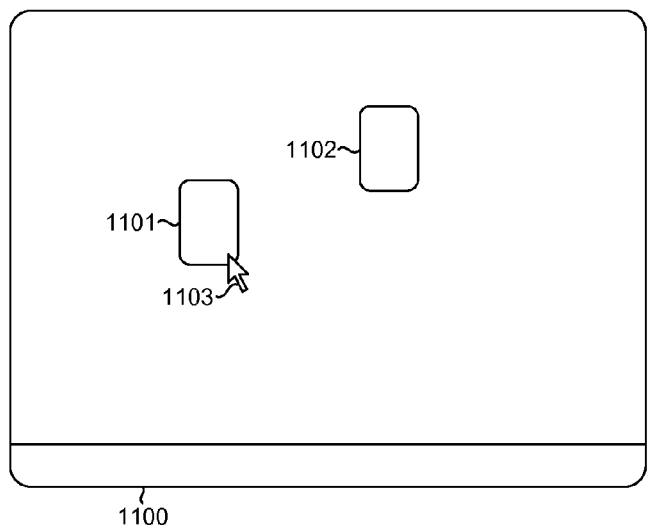
FIGS. 11-13 show illustrative screenshots where a drag/drop operation causes a preview feedback instance to be presented either near the cursor or in another location on the screen.
Figure 12:
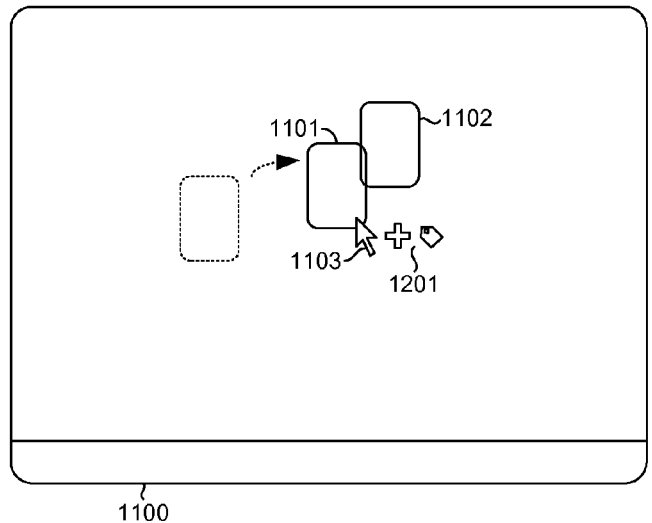
Figure 13:
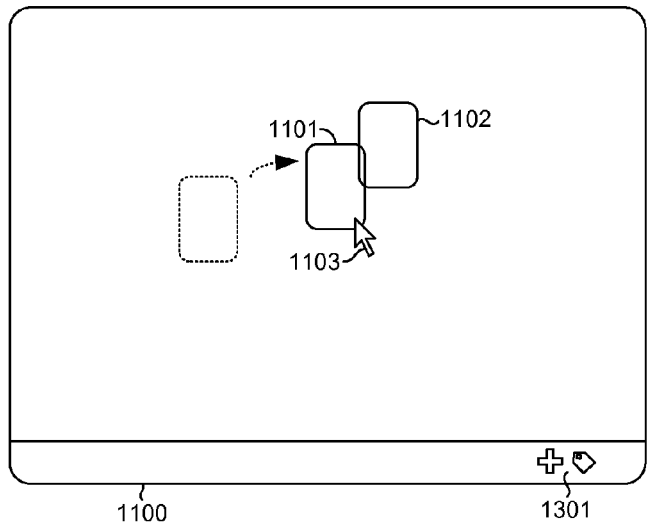

With the exception of the feedback shown in FIG. 5, each of these feedback instances may be presented to the user responsive to the selected object being moved proximate to (e.g., within a threshold distance of; or overlaying) the target. For instance, referring to FIG. 11, a screen 1100 is shown in which a user is about to drag a selected object 1101 over to a target object 1102 using cursor 1103. Referring to FIG. 12, selected object 1101 has now been dragged and is now proximate to (and indeed, in this case, overlaying) target object 1102. In response, feedback 1201 is presented proximate to cursor 1103. Alternatively, or additionally, with reference to FIG. 13, feedback 1301 may be presented in a location on screen 1100 unrelated to the position of cursor 1103, such as in a pre-existing status bar or in a pop-up window.

Figure 14:
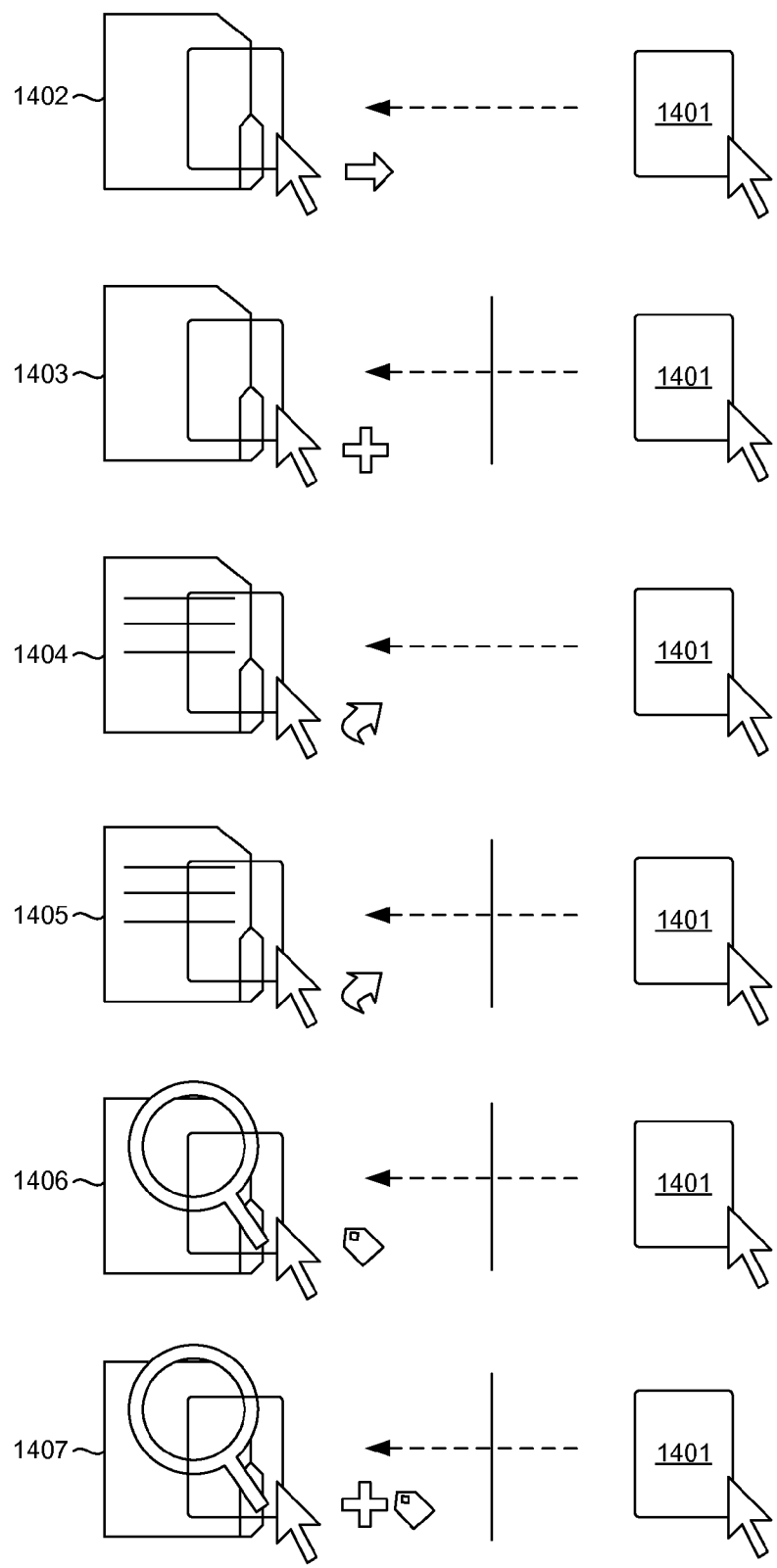
FIG. 14 shows illustrative preview feedback instances that may be presented III response to dragging an item over various types of target objects.
Figure 15:
FIGS. 15-18 show illustrative preview feedback instances that each include explanatory text.
Figure 16:

As already mentioned, the particular feedback provided to the user depends upon which action(s) are to be taken upon completion of the drag/drop operation. An example of feedback that may be provided is shown in FIG. 14, with reference to the "Item" row of the table in FIG. 2. Where an item 1401 is dragged over a folder 1402 in the same volume, feedback as in FIG. 9 is provided, indicating that item 1401 would be moved into folder 1402 upon dropping item 1401 there. Where item 1401 is dragged over a folder 1403 in a different volume, feedback as in FIG. 4 is provided, indicating that item 1401 would be copied into folder 1403 upon dropping item 1401 there. Where item 1401 is dragged over a list 1404 in the same volume, feedback as in FIG. 6 is provided, indicating that a reference to item 1401 would be added to list 1404 upon dropping item 1401 there. The same is indicated where item 1401 is dragged over a list 1405 in a different volume. Where item 1401 is dragged over a persisted auto-list 1406, and where item 1401 is within the scope of persisted auto-list 1406, feedback as in FIG. 7 is provided. Such feedback indicates that one or more properties of item 1401 will be modified such that item 1401 will be listed in persisted auto-list 1406, upon dropping item 1401 there. Where item 1401 is dragged over a persisted auto-list 1407, and where item 1401 is outside the scope of persisted auto-list 1407, feedback as in FIGS. 4 and 7 is provided. Such feedback indicates that item 1401 will be copied to a location within the scope, and that one or more properties of the copy of item 1401 will be modified such that the copy of item 1401 will be listed in persisted auto-list 1407, upon dropping item 1401 there.

Referring to FIGS. 15-18, the preview feedback may additionally or alternatively include a textual explanation that more fully explains details of each action to be taken. For example, the feedback instance in FIG. 15 indicates to the user that properties of the selected item will be changed, and in particular the labels "Projects" and "Work" will be added as intrinsic properties to the item. The feedback instance in FIG. 16 indicates to the user that the selected item will be copied and its properties will be modified, and in particular that the selected item will be copied to the location Desktop and the labels "Urgent" and "Personal" will be added as intrinsic properties to the selected item.

Figure 17:
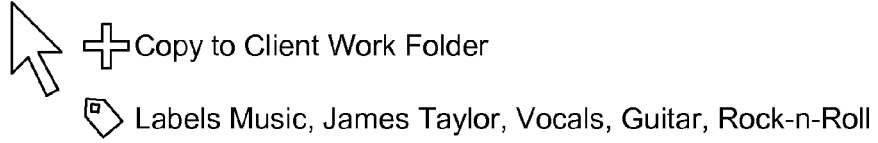
Figure 18:
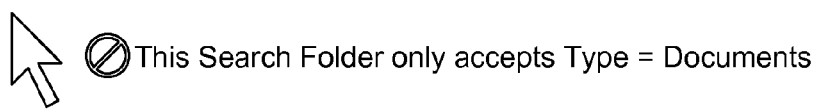

The feedback instance in FIG. 17 also provides detailed information to the user. In this case, the selected item will be copied to the location Client Work Folder, and various indicated labels will be added as properties to the item. It should be noted that, where the descriptive text becomes too long, as in FIG. 17, the text may fade away as shown. The feedback instance in FIG. 18 indicates not only that the drag/drop operation will not work, but also why it will not work. In this example, the operation will not work because a non-document is being dragged over a persisted auto-list defining a criteria that allows only documents to be referenced.

Dragging/Dropping into Child Objects in a Hierarchy

Thus far it has been assumed that the target object has been displayed on the screen during dragging. However, all of the discussion herein may also apply to dragging to target objects that are children of such objects and that are not displayed on the screen at the beginning of a drag. For example, a main object, such as a folder, list, or persisted auto-list, may contain child objects. The user may desire to drop a selected object into one of the child objects even if only the main object is presently being displayed. This may be done as illustratively described with reference to FIGS. 19-23.

Figure 19:
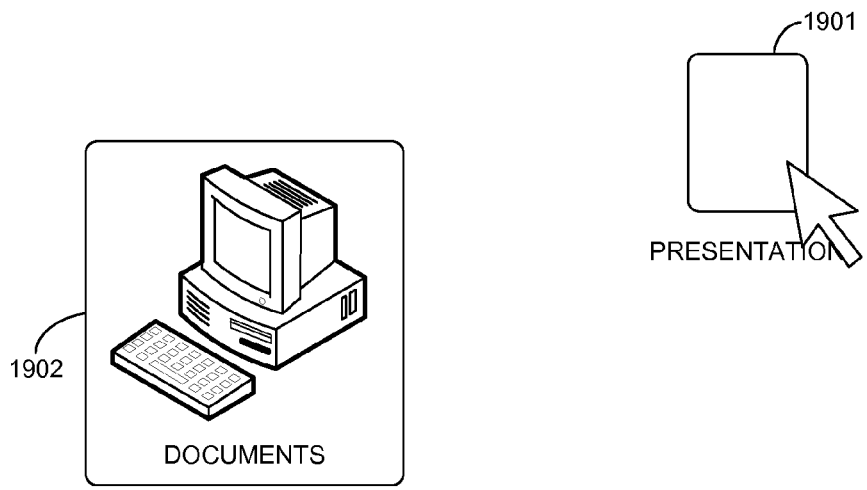
FIGS. 19-23 show an illustrative response to dragging an object over a target object having child objects below it in a hierarchy.
Figure 20:
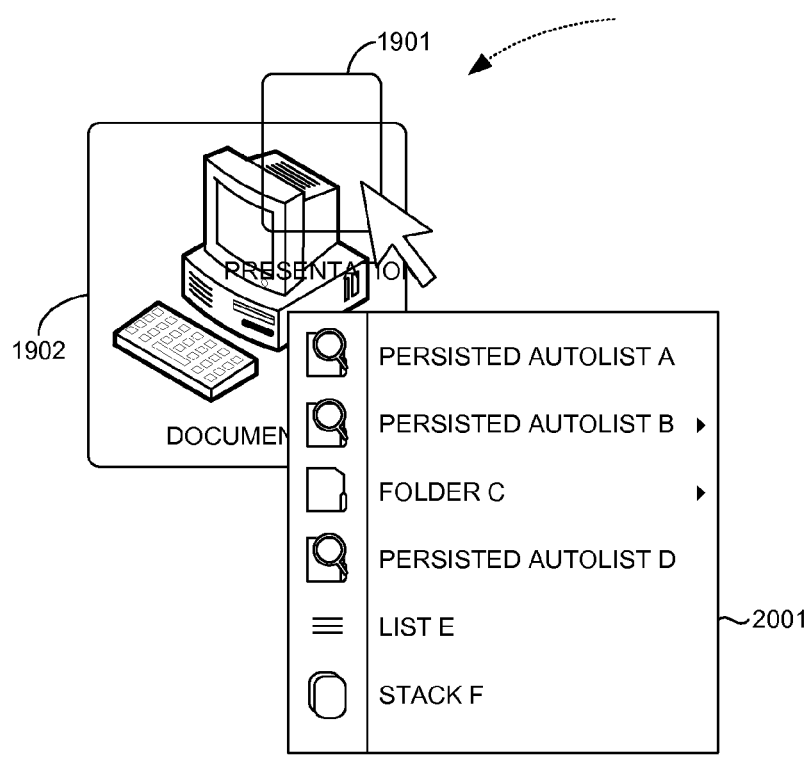
Figure 21:
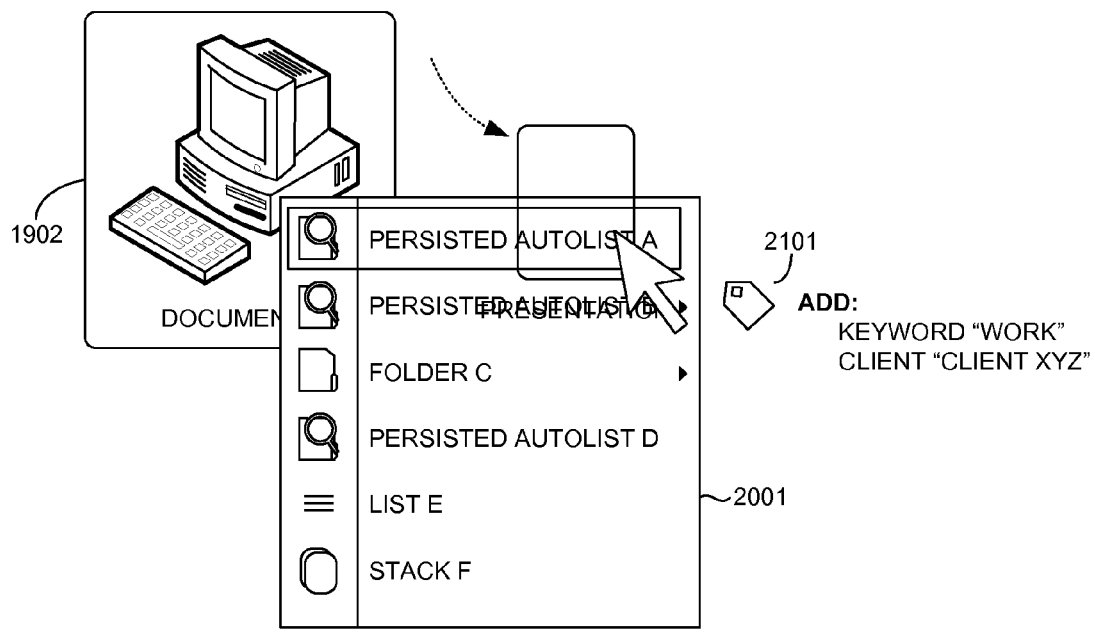

In FIG. 19, the user may select an object 1901 for dragging. Assume that the user decides to drop object 1901 onto a child object of folder 1902. Thus, referring to FIG. 20, the user drags object 1901 over folder 1902. In response, computer 100 displays a window 2001 listing the child objects contained within folder 1902. Referring to FIG. 21, the user may then drag object 1901 down over window 2001 to select a particular child object listed therein as desired. As object 1901 is dragged over each child object, appropriate preview feedback may be provided to the user. For example, as object 1901 is dragged over the first child object listed ("Persisted Auto List A"), a preview feedback 2101 indicating that, should object 1901 be dropped there, the properties of object 1901 would be modified to add "Work" to its Keyword property and "Client XYZ" to its Client property. This is likely because Persisted Auto List A defines criteria that require these properties of any object that is referenced by it.

Figure 22:
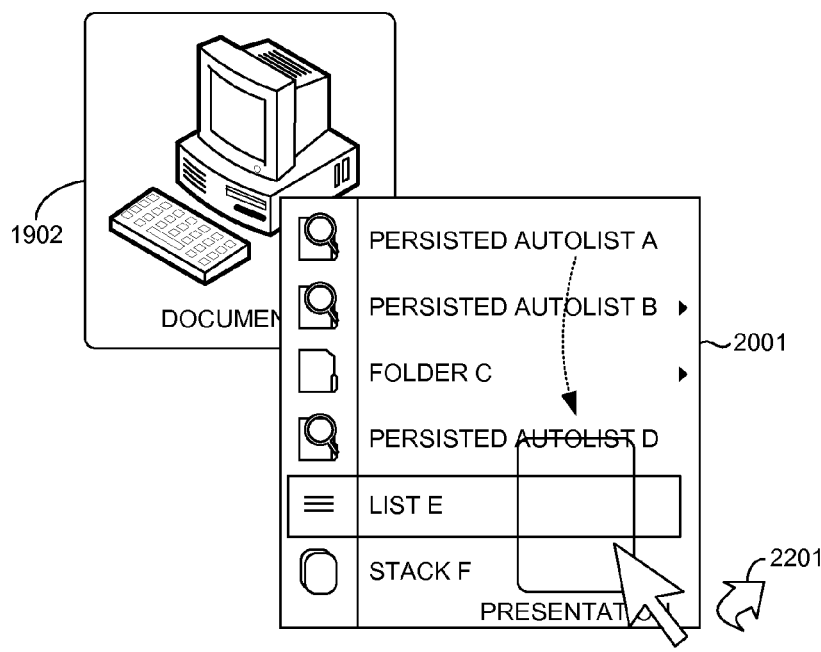
Figure 23:
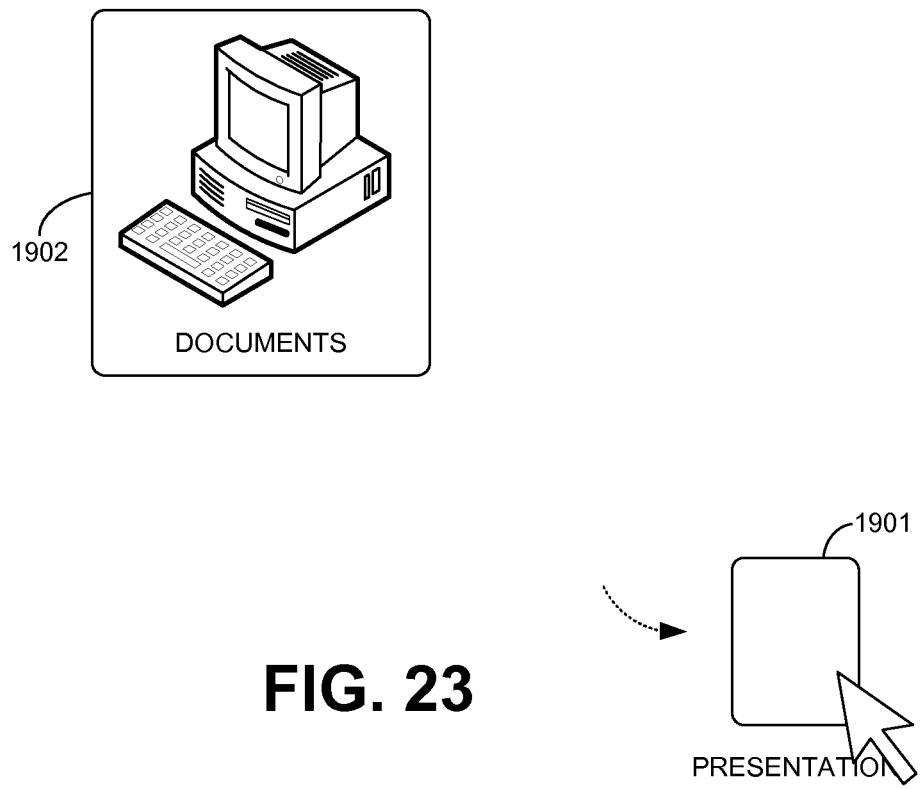

As the user continues to drag object 1901 down over window 2001, object 1901 may eventually be positioned over List E, as shown in FIG. 22. In this case, preview feedback 2201 is presented that indicates that object 1901 would be referenced by List E upon dropping object 1901 over it. The user may choose to do so. The user may alternatively choose not to drop object 1901 on any of the child objects shown in window 2001, and instead either abort the drag/drop or drag onto a completely different folder. In this case, user may drag object 1901 away from folder 1902 and window 2001, as shown in FIG. 23. As shown, in response to dragging object 1901 away from folder 1902 and/or window 2001, window 2001 automatically disappears. This may provide for a convenient way for the user to drop objects onto other objects located deep in a hierarchy without having to manually open and close container objects such as folder, lists, and persisted auto-lists.

CONCLUSION

Thus, an improved way of managing objects in an electronic file system has been described. In accordance with various aspects of the present disclosure, the drag/drop operation has become a powerful tool for dealing with the concepts of lists, persisted auto-lists, and stacks, for example. In addition, to deal with this increasing power and the complexity that goes with it, the user is now able to preview which of a number of different possible actions will be taken in response to a completed drag/drop operation.

What is claimed is:

1. One or more computer-readable storage media having computer-executable instructions embodied thereon that, when executed by a computing device, perform a method for dragging and dropping an object, the method comprising:
   receiving a user input via a graphical user interface to drag an object proximate to a persisted auto-list, thereby initiating a drag/drop operation;
   displaying a preview of multiple different types of actions that will take place in response to dropping the object onto the persisted auto-list based on a predefined relationship between the object and the persisted auto-list;
   receiving additional input from the user during the drag/drop operation that causes a new action in addition to at least one of the multiple different types of actions to take place in response to dropping the objection onto the persisted auto-list; and
   performing the new action and the at least one of the multiple different types of actions in response to the object being dropped onto the persisted auto-list after said displaying.

2. The computer-readable storage media of claim 1, wherein one of the actions comprises moving a file system location of the object.

3. The computer-readable storage media of claim 1, wherein one of the actions comprises copying the object.

4. The computer-readable storage media of claim 1, wherein one of the actions comprises modifying, adding, or removing at least one property of the object to meet at least one criterion defined by the persisted auto-list.

5. The computer-readable storage media of claim 1, wherein the object is a folder and the action is to modify, add, or remove at least one property of a second object contained in the folder.

6. The computer-readable storage media of claim 1, wherein the persisted auto-list comprises a scope that does not include the object, and wherein the action comprises copying the object into the scope and modifying, adding, or removing at least one property of the copy of the object.

7. The computer-readable storage media of claim 1, wherein the preview is displayed in a location unrelated to the position of the cursor, the persisted auto-list, and the object.

8. A computer implemented method for displaying icons using a computer system having a processor, memory, and data storage subsystems, the method comprising:

detecting a dragging of a first displayed object of a first type proximate to a second displayed object of a second type;

selecting a plurality of preview icons based upon a predefined relationship between the first type of the first displayed object and the second type of the second displayed object; and displaying the plurality of preview icons to a user in response to said detecting, the plurality of preview icons representing different types of actions that will be taken in response to a dropping of the first displayed object onto the second displayed object, wherein the plurality of preview icons move with the cursor and are displayed proximate to the cursor.

9. The method of claim 8, further comprising:

performing the different types of actions in response to the first displayed object being dropped onto the second displayed object.

10. The method of claim 8, wherein the different types of actions comprises moving a file system location of the first displayed object.

11. The method of claim 8, wherein the different types of actions comprises copying the first displayed object.

12. The method of claim 8, wherein the different types of actions comprises modifying, adding, or removing at least one property of the first displayed object to meet at least one criterion defined by the second displayed object.

13. The method of claim 8, wherein detecting the dragging of the first displayed object of the first type to the second displayed object of the second type comprises, utilizing a virtual container representing a set of items as one of the first type and the second type.

14. The method of claim 8, wherein simultaneously displaying the plurality of icons further comprises, displaying a window listing a plurality of child objects contained within the second displayed object, and displaying an icon representative of an action to be taken with the plurality of child objects in response to the dragging of the first displayed object proximate to the corresponding plurality of child objects.

15. In a computer system having a processor, memory and data storage subsystems, a computer-implemented icon displaying system, comprising:

a first displayed object of a first type;

a second displayed object of a second type; and a plurality of preview icons simultaneously displayed to a user via a graphical user interface of the computer-implemented icon displaying system in response to the first displayed object being dragged proximate to the second displayed object, the plurality of preview icons representing different types of actions to be taken in response to the first displayed object being dropped onto the second displayed object, wherein the plurality of preview icons are displayed proximate to the cursor, wherein the plurality of preview icons simultaneously displayed is based upon a predefined relationship between the first type of the first displayed object and the second type of the second displayed object.

16. The system of claim 15, wherein one of the plurality of icons represents a moved file system location of the first displayed object.

17. The system of claim 15, wherein one of the plurality of icons represents a copy of the first displayed object.

18. The system of claim 15, wherein one of the plurality of icons represents a modified, added, or removed property of the first displayed object to meet at least one criterion defined by the second displayed object.

19. The system of claim 15, wherein one of the first type and the second type comprises a virtual container representing a set of items.

20. The system of claim 15, wherein each of the first displayed object and the second displayed object comprise at least one of a list, a persisted auto-list, a folder, and a stack.

\* \* \* \* \*